United States Patent
Sharma et al.

(10) Patent No.: US 11,038,803 B2
(45) Date of Patent: Jun. 15, 2021

(54) CORRELATING NETWORK LEVEL AND APPLICATION LEVEL TRAFFIC

(71) Applicant: salesforce.com, inc., San Francisco, CA (US)

(72) Inventors: Shel Sharma, Saratoga, CA (US); Nitin Bhatia, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/779,071

(22) Filed: Jan. 31, 2020

(65) Prior Publication Data

US 2021/0099394 A1 Apr. 1, 2021

Related U.S. Application Data

(60) Provisional application No. 62/909,100, filed on Oct. 1, 2019.

(51) Int. Cl.
| | |
|---|---|
| *H04L 12/851* | (2013.01) |
| *H04L 12/26* | (2006.01) |
| *H04L 29/06* | (2006.01) |
| *H04L 12/46* | (2006.01) |
| *G06F 16/38* | (2019.01) |
| *H04L 12/859* | (2013.01) |

(52) U.S. Cl.
CPC ........ *H04L 47/2483* (2013.01); *G06F 16/381* (2019.01); *H04L 12/4641* (2013.01); *H04L 43/12* (2013.01); *H04L 47/2475* (2013.01); *H04L 63/0435* (2013.01); *H04L 63/1425* (2013.01)

(58) Field of Classification Search
CPC . H04L 47/2483; H04L 12/4641; H04L 43/12; H04L 47/2475; H04L 63/0435; H04L 63/1425; G06F 16/381
See application file for complete search history.

(56) References Cited

U.S. PATENT DOCUMENTS

| | | | |
|---|---|---|---|
| 8,417,938 B1 * | 4/2013 | Considine | G06F 9/5088 713/151 |
| 2013/0347103 A1* | 12/2013 | Veteikis | H04L 43/04 726/22 |
| 2014/0201838 A1* | 7/2014 | Varsanyi | G06F 21/552 726/23 |
| 2016/0359872 A1* | 12/2016 | Yadav | H04L 43/0894 |
| 2018/0095941 A1* | 4/2018 | Ciabarra, Jr. | G06F 40/123 |

* cited by examiner

*Primary Examiner* — Duc C HO
(74) *Attorney, Agent, or Firm* — Holland & Hart LLP

(57) ABSTRACT

Methods, systems, and devices supporting network and container level traffic analysis and correlation are described. An application server may receive network traffic data from a network-level data capture system and receive container-level application traffic data from a container-level data capture system. The application server may then hash the destination addresses, the time stamp information, and the data amount information from the network traffic data to create a first set of hash values and hash the destination addresses, the time stamp information, and the data amount information from the application traffic data to create a second set of hash values. The application server may then identify matching hash values from the first set of hash values and the second set of hash values and then merge into a data queue the corresponding network traffic with metadata associated with the corresponding application traffic data to create a merged data set.

20 Claims, 11 Drawing Sheets

CORRELATING NETWORK LEVEL AND APPLICATION LEVEL TRAFFIC

CROSS REFERENCES

The present Application for Patent claims priority to U.S. Provisional Patent Application No. 62/909,100 by Sharma et al., entitled "CORRELATING NETWORK LEVEL AND APPLICATION LEVEL TRAFFIC," filed Oct. 1, 2019, assigned to the assignee hereof.

FIELD OF TECHNOLOGY

The present disclosure relates generally to database systems and data processing, and more specifically to correlating network level and application level traffic.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A cloud platform may include one or more pods running within a host, and the host may be running within a public cloud environment (e.g., a network). Furthermore, the pods may include groups of containers, and applications may run within the containers. Traffic flowing to the network, from the network, or within the network may be captured. However, in such architectures, the originating application or container may not be identifiable from the captured network traffic.

DETAILED DESCRIPTION

Figure 1:
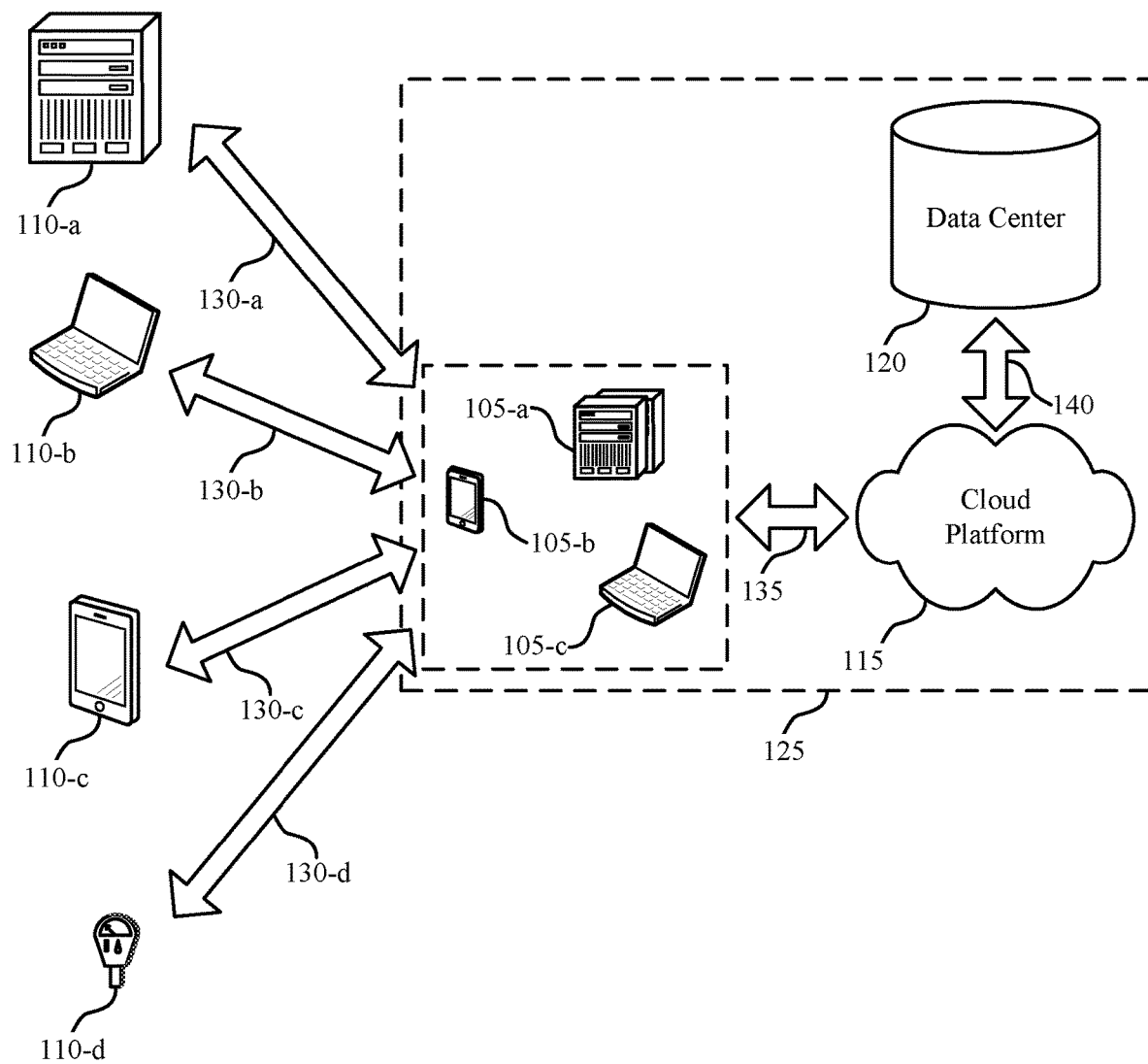
FIG. 1 illustrates an example of a system for data processing that supports correlating network level and application level traffic in accordance with aspects of the present disclosure.

A network system (e.g., a cloud based system) may include one or more pods within a network orchestration system. The one or more pods may include one or more containers, and one or more applications may run within these one or more containers. A container may include a portable executable image that contains software and all of its dependencies.

A network traffic packet capture tool may monitor and capture data transmissions across the network (e.g., from a container to another container or from a container to an entity outside of the network environment). A network packet capture tool may capture network level traffic from a tap (e.g., a virtual tap). Typical network traffic packet capture tools do not have access to application or container level data traffic, because such network traffic packet capture tools monitor and capture data transferred at higher layers (e.g., the virtual network layer, a cloud provider network layer, etc.).

An application or container level traffic packet capture tool, such as a traffic visibility library, can be used to enable network visibility and monitor host and container communications for different container runtimes. Such applications may capture container to container communications that occur at lower layers within the network stack, such as at an integration bridge layer or an overlay network layer. The container level traffic may be stored in a queue for subsequent analysis.

However, analyzing network traffic may pose challenges when the network traffic is in a cloud environment (e.g., a public cloud). The use of dynamic or ephemeral interne protocol (IP) addresses may obscure the source or destination of network traffic. In some cases, network traffic in a public cloud environment may not be attributable to applications, containers, or hosts. For example, containers or virtual hosts may create challenges when attributing or associating network traffic with users, applications, IP addresses, computing devices, etc.

Some cloud platforms may use multiple network layers to transmit data. Data may move across multiple network layers, physical devices, virtual devices, or interfaces. In some cases, a device or interface may alter data before, during, or after transmission. In some examples, a device may receive data, alter the data, and transmit the altered data to another interface or device. For example, a device may receive a data packet (e.g., a message, a segment, a datagram, a frame, or any other protocol data unit (PDU)), alter an IP address in the data packet, and transmit the message to another device. In some cases, a device or interface may receive data in a standard form (e.g., plaintext) and change the data into an alternative form (e.g., ciphertext). In some cloud platforms, it may be challenging to correlate or associate application data with network data. In some cases, it may be challenging to use network traffic for threat detection, troubleshooting, forensic investigations, etc.

In accordance with aspects of the present disclosure, the traffic data from the network level traffic capture and the container level traffic capture can be correlated such that the container, process, or application that originated network traffic can be identified. For example, the container level traffic capture information may include IP addresses of the source and destination, timestamps, source and destination port numbers, and the amount of network data transferred in bytes. Similarly, the network level traffic capture may include source and destination IP address, timestamps, source and destination port numbers, and the amount of network data transferred in bytes for packets being transferred from a container within the network environment to a destination outside of the host environment (e.g., a destination outside the network). In some cases, traffic between containers within the host network environment may not be captured by the network level traffic capture.

One or more of the parameters from the network level traffic capture and the container level traffic capture may be hashed. For example, the amount of data transferred to a particular destination address (e.g., IP address or port number) during a particular period of time (based on the timestamps) for the network level traffic capture may be hashed. Similarly, the amount of data transferred to a particular destination address (e.g., IP address or port number) during a particular period of time (based on the timestamps) for the container level traffic capture may be hashed. Since the amount of data transferred during a particular period of time to a particular destination is uniquely identifiable, the hashes from the network level traffic and the container level traffic may match. The process of identifying matching hashes between the network traffic and container traffic may be referred to as mapping or correlating. As such, the network traffic for this particular time may be correlated with the container traffic for this particular time. In some cases, the correlation or mapping may occur at the queue where the container level traffic is stored. In this way, the application, process, or container that originated the traffic can be correlated with the network level traffic data. This correlation may provide enhanced visibility into network traffic to assist with threat hunting, intrusion detection, and troubleshooting tools and techniques.

In some cases, once the data is correlated, it may be merged and stored in a database for subsequent analysis. In addition, metadata from a container level library may be correlated with the merged data and stored along with or in association with the merged data in the queue and/or in a database. In some cases, the metadata is not hashed along with the other parameters of the traffic data. The queue may perform the correlation and then the merged data may be sent to a database for subsequent analysis and viewing.

In some cases, a separate library or module may provide network level packet capture as well as container level or application level packet capture. In some examples, the module may support packet capture, application metadata capture, packet analysis, metadata analysis, data correlation, or any combination thereof. In some cases, the data correlation may correlate or otherwise associate network packets with application data. In some cases, the network packets may originate from a container, and the module may support determining application information (e.g., metadata) based on the captured network packet. In some cases, the module may provide packet filtering such that such that a subset of the network level data is sent to downstream systems for analysis. In some examples, the module may filter packets based on a protocol type, a packet size, a timestamp, or any combination thereof. In some cases, the module may capture network packets that can be used to correlate application or container level information with network traffic. For example, network packets of a protocol type may be captured and inspected to determine application information (e.g., application metadata) related to the network traffic.

Aspects of the disclosure are initially described in the context of an environment supporting an on-demand database service. Aspects of the disclosure are further described in the context of a data analysis system, a public cloud platform environment, and a virtual host. Aspects of the disclosure are further illustrated by and described with reference to apparatus diagrams, system diagrams, and flowcharts that relate to correlating network level and application level traffic.

FIG. 1 illustrates an example of a system 100 for cloud computing that supports correlating network level and application level traffic in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system.

In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some cases, the cloud platform 115 may be an example of a public cloud platform that implements containers or a container architecture. In accordance with aspects of the present disclosure, the cloud platform 115 may correlate network level traffic data and container level traffic data to identify the applications or containers that generated particular network traffic. As described in more detail herein, the correlation may include hashing one or more aspects of the network and container traffic (e.g., IP addresses, data transfer amounts, time stamps), and comparing the hashes to identify matches between the network level and container level traffic. Additionally or alternatively, the data center 120 may perform this analysis.

As discussed above, analyzing network traffic may pose challenges when the network traffic is in a cloud environment (e.g., a public cloud). The use of dynamic or ephemeral IP addresses may obscure the source or destination of the network traffic. Furthermore, typical network level traffic capture systems may not have visibility into application or container level traffic because the network level traffic systems may be configured to monitor higher level layers. In such cases, network traffic in a cloud platform 115 may not be attributable to applications, containers, or hosts. For example, containers or virtual hosts may create challenges when attributing or associating network traffic with users, applications, IP addresses, computing devices, etc.

In accordance with aspects of the present disclosure, the outputs from a network level traffic capture system (e.g., a tap) and a container level traffic capture system (e.g., a traffic visibility library) may be hashed and correlated such that network traffic can be attributed to a particular originating application or container. Such techniques may bridge the gap between the technical shortcomings of the network level traffic capture systems, while leveraging the functionality of container level traffic capture systems.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

A cloud platform 115 may analyze data traffic to manage system functionality. A traffic analyzer (e.g., 105) may inspect application data and network data to correlate application data with network data. In some cases, application data may be captured at a host and may be associated with corresponding applications (e.g., users, services, processes, etc.). In some cases, network data may be captured at a virtual or physical device (e.g., a terminal access point (TAP)). In some examples, a traffic analyzer may map, correlate, or otherwise associate application data of a host with network data. The associated application data and network data may enhance threat detection, intrusion detection, as well as troubleshooting tools and techniques.

Some cloud platforms 115 may provide environments that are non-proxy and network address translation (NAT) based. In some cases, a kernel library or module (e.g., libeBPFflow) may be used to provide application data (e.g., application connectivity information, application metadata, etc). For example, the kernel library may provide application connectivity information such as IP addresses, timestamp information, a network protocol, source and destination port number, amount of network data transferred (e.g., data flows), etc. In some examples, the amount of network data transferred may be provided in bits, nibbles, bytes, kilobytes, megabytes, etc. Additionally or alternatively, the application connectivity information may include application data, application metadata, or container data. In some cases, application data may be hashed. For example, IP address information between a source and destination may be hashed, an amount of data transferred (e.g., a number of bytes) at a particular time may be hashed, a network protocol, source and destination port numbers may be hashed. In some examples, the application data may be hashed at a container, host, or cluster. In some examples, application metadata may be captured. For example, a host identifier (ID) may be captured, a container ID may be captured, a process ID may be captured, a service ID may be captured, a user may be captured, a binary name may be captured, an executable name may be captured, or any combination thereof.

In some cases, a network TAP may be used to capture network data. In some examples, network data may be hashed. For example, source and destination IP addresses may be hashed, source and destination port numbers may be hashed, and an amount of data transferred (e.g., a number of bytes) at a particular time may be hashed. In some examples, application data hashes and network data hashes may be used to may be mapped, correlated, or otherwise associate application data with network data. For example, an application data hash matching a network data hash may indicate an association between the application data and network data. In some cases, application metadata may be merged or grouped with network data based on one or more application data hashes matching one or more network data hashes. In some examples, the application metadata may be merged or grouped with network data in a pipeline (e.g., a queue, logstash, etc.). In some examples, the merged or grouped information may be forwarded to a database (e.g., an elastic search database).

In some cases, a library or module may collect network traffic and extract application metadata while running in Linux Kernel mode. In some examples, the application metadata may include application IDs, process IDs, host IDs, container IDs, service IDs, users, etc. In some cases, the library or module may capture a limited amount of network bytes (e.g., flows) transferred between a source IP and destination IP at a given time. In some examples, the library or module may filter traffic. In some cases, the library or module may share information to one or more Linux processes running in user space. In some examples, one or more Linux processes may be local processes. In some examples, one or more Linux processes may be remote.

Figure 2:
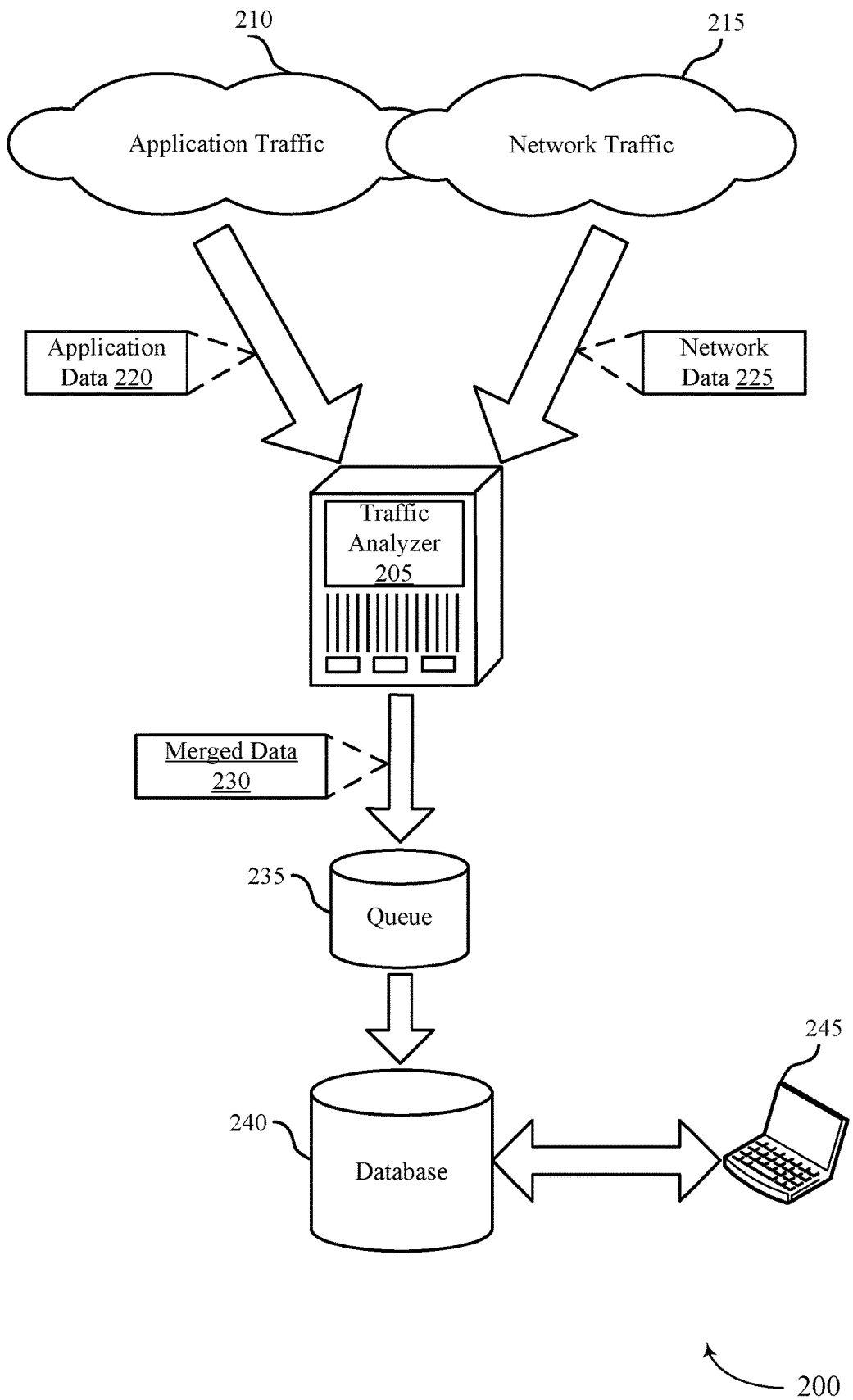
FIG. 2 illustrates an example of a data analysis system that supports correlating network level and application level traffic in accordance with aspects of the present disclosure.

FIG. 2 illustrates an example of a data analysis system 200 that supports data traffic analysis in accordance with aspects of the present disclosure. The data analysis system 200 includes a traffic analyzer 205, application traffic 210, network traffic 215, application data 220, network data 225, merged data 230, a queue 235, a database 240, and a user equipment 245. The system 200 may implement aspects of a system 100 as described with reference to FIG. 1. For example, a database 240 may be an example or component of a data center 120. The traffic analyzer 205, application traffic 210, network traffic 215, application data 220, and network data 225 may implement aspects of subsystem 125 as described with reference to FIG. 1.

The traffic analyzer 205 may represent aspects of an application server, communication server, data processing server, database server, cloud-based server, server cluster, virtual machine, container, pod, host, or some similar data processing device or system. The traffic analyzer 205 may communicate with other devices such as queue 235. In some cases, queue 235 may be a logstash, a persistent queue, or a priority queue. In some examples, the application traffic 210 may be captured at a host (e.g., a virtual environment, a container, a pod, a virtual machine, a cluster, a node, Kubernetes, Docker host, etc.).

In some cases, a kernel library or module (e.g., libeBPF-flow) may be used to capture application data 220. In some cases, application data 220 may contain data from application traffic 210 (e.g., connectivity information). Additionally or alternatively, application data 220 may contain additional data (e.g., application metadata). In some examples, application data 220 may include application connectivity information (e.g., source and destination IP addresses, source and destination port numbers, timestamps, an amount of network data transferred, etc.), application metadata (e.g., application ID, process ID, host ID, container IDs, service IDs, users, binary name, etc.), or both. In some cases, application metadata may correspond to application connectivity information. In some cases, the connectivity information and/or application metadata may be captured by a kernel library or module (e.g., libeBPFflow). In some cases, the application connectivity information may be hashed. In some examples, the traffic analyzer 205 may hash some or all of the connectivity information.

In some cases, a TAP (e.g., a virtual TAP) may be used to capture network data 225. In some cases, network data 225 may contain data from network traffic 215 (e.g., network packets). In some cases, network data 225 may contain network packet information (e.g., source and destination IP addresses, source and destination port numbers, an amount of network data transferred, an amount of network data transferred at a particular time, etc.). In some cases, the network packet information may be hashed. In some examples, traffic analyzer 205 may hash some or all of the network packet information. For example, information traffic analyzer 205 may hash some or all of the fields for some or all of the network packet information.

The traffic analyzer 205 may correlate or associate a subset of application data 220 with a subset of network data 225. For example, traffic analyzer 205 may identify a hash of the application connectivity information that matches a hash of the network packet information and associate the corresponding metadata with the network packet information. In some examples, application metadata may be associated with application connectivity information. In some examples, traffic analyzer 205 may merge the metadata with the network packet information into queue 235 (e.g., a pipeline, a logstash, etc.). In some examples, traffic analyzer 205 may merge application metadata with network packet information into merged data 230. The traffic analyzer 205 may transmit merged data 230 to queue 235. In some examples, a hash of the application connectivity information may include a hashed source IP address, a hashed destination IP address, a hashed combination of a source and a destination address, a hashed time stamp, a hashed amount of network data transferred (e.g., a flow, a number of bytes, etc.), or any combination thereof. In some examples, a hash of the network packet information may be a hashed source IP address, a hashed destination IP address, a hashed combination of a source and a destination address, a hashed time stamp, a hashed amount of network data transferred (e.g., a flow, a number of bytes, etc.), or any combination thereof. The traffic analyzer 205 may merge application metadata with network packet information when a threshold of matches (e.g., 1 match, 2 matches, etc.) is met or exceeded. Additionally or alternatively, the traffic analyzer 205 may merge application metadata with network packet information when network packet data contains a specified IP address, port number, amount of data, protocol type, or any combination thereof.

In some cases, a queue 235 may receive merged data 230. In some cases, the queue 235 may associate metadata and network packet information of merged data 230 when storing merged data 230. In some cases, the queue 235 may transmit data to a database 240. In some examples, the database 240 may be an elastic search database. In some examples, the database 240 may be a relational database or a non-relational database. A user equipment 245 may connect to the database 240. In some examples, the user equipment 245 may transmit a query to the database 240, and the user equipment 245 may receive a query result set from the database 240. In some examples, the user equipment 245 may support data filtering. For example, the user equipment 245 may support the filtering and/or sorting of merged data 230. In some cases, the merged data 230 may be filtered or sorted according to a source IP address, a destination IP address, an amount of data transferred (e.g., a number of bytes), a protocol type, or any combination thereof.

Figure 3:
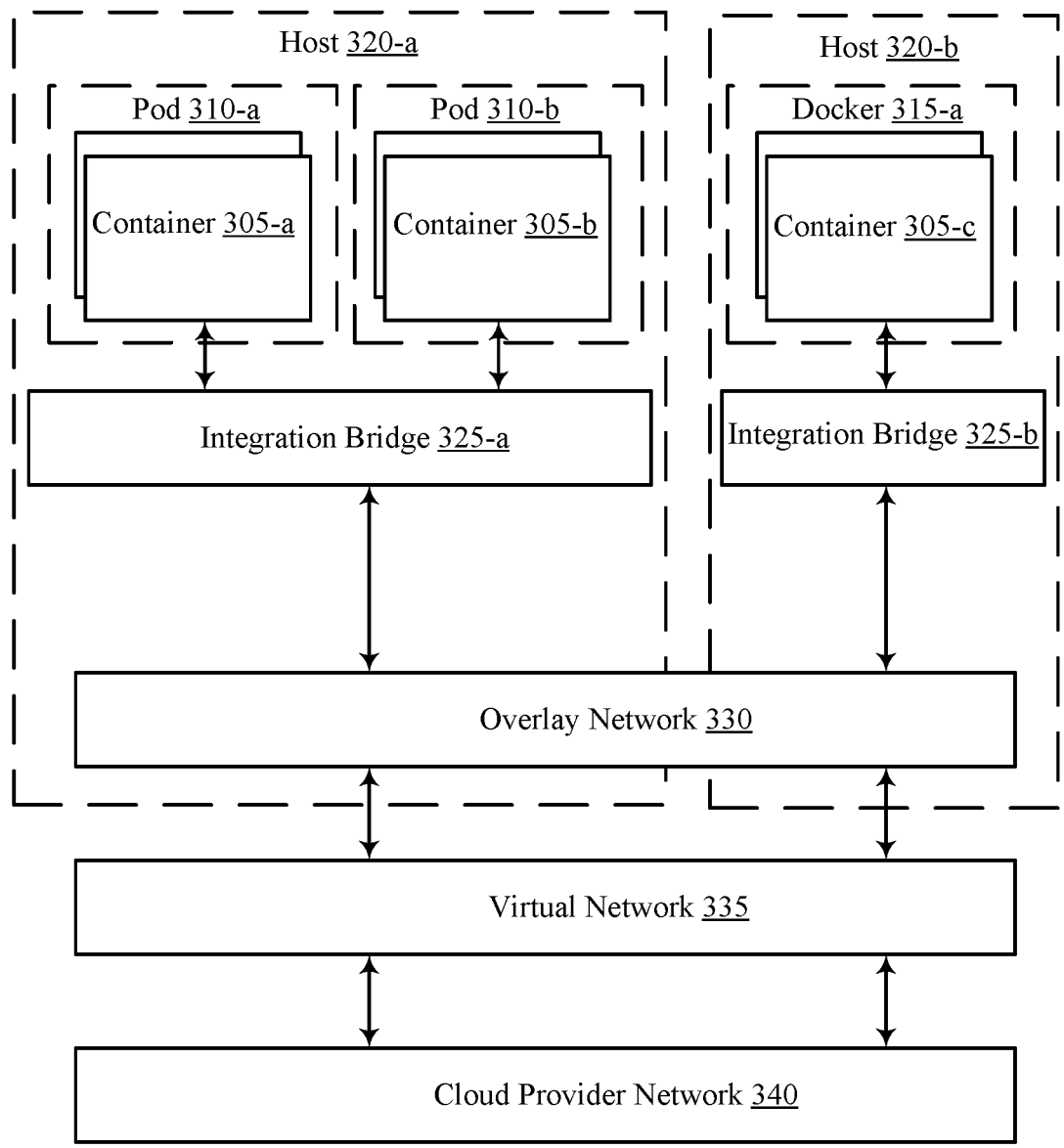
FIG. 3 illustrates an example of a public cloud platform that supports correlating network level and application level traffic in accordance with aspects of the present disclosure.

FIG. 3 illustrates an example of a public cloud environment 300 that supports data traffic analysis in accordance with aspects of the present disclosure. The public cloud environment 300 includes a number of containers 305, a number of pods 310, a Docker instance 315-a, a number of hosts 320 (e.g., a Kubernetes host, a Docker host, a host cluster, a host operating system), a number of integration bridges 325, an overlay network 330, a virtual network 335, and a cloud provider network 340, which may be examples or components of one or more servers and/or cloud platforms as described with reference to FIGS. 1 and 2. For example, host 320-*a* and/or host 320-*b* may generate application traffic and/or network traffic.

In some examples, the application traffic may be generated from a container. Host 320-*a* and/or host 320-*b* may run a kernel library or module (e.g., libeBPFflow), and the kernel library may be used to capture application metadata and/or application connectivity information. A packet capturing system (e.g., Moloch capture) may run as container 305-*a*, and a queue (e.g., logstash) may run as container 305-*b*. In some examples, pod 310-*a* and/or pod 310-*b* may be run as a dedicated Moloch capture pod. One or more TAPs (e.g., a virtual TAP) may be used to monitor data within the public cloud platform environment. In some examples, a TAP may be placed between integration bridge 325-*a* and overlay network 330. In some additional or alternative examples, a TAP may be placed between the virtual network 335 and the cloud provider network 340. The packet capturing system may receive or retrieve network packet information from one or more TAPs. In some cases, the packet capturing system may receive or retrieve application metadata and/or application connectivity information from the one or more kernel libraries.

In some examples, container 305-*c* may generate a data packet, and the data packet may contain one or more IP addresses (e.g., a source IP address, a destination IP address, etc.). In some examples, the data packet may travel across one or more network layers (e.g., integration bridge 325, overlay network 330, virtual network 335, cloud provider 340). In some examples, one or more IP addresses in the data packet may change while the data packet is traveling. For example, the data packet source IP address may be a first address when the packet is generated at container 305-*c*, and the source IP address may change to a second address when the packet is traveling across the virtual network 335.

Figure 4:
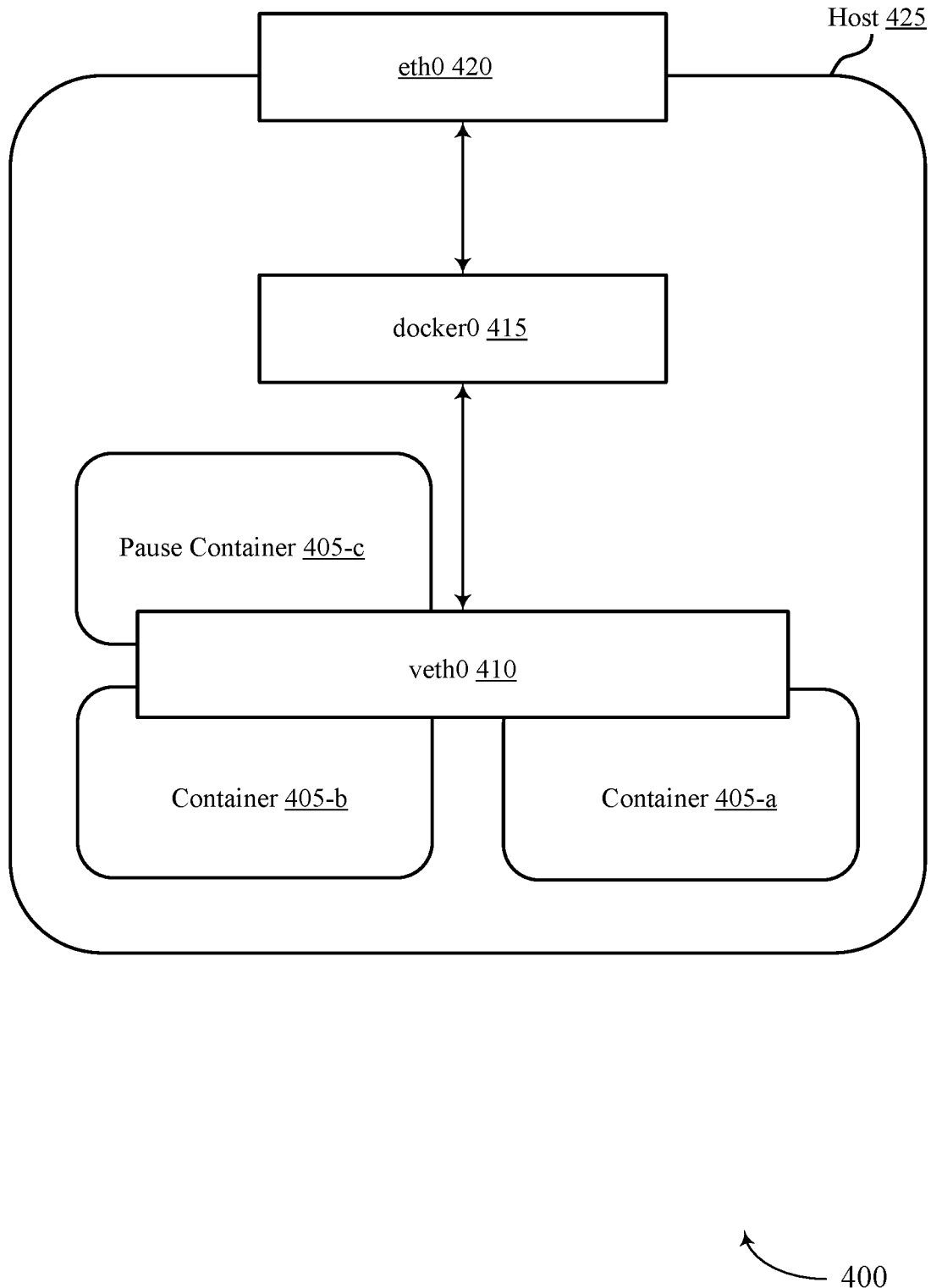
FIG. 4 illustrates an example of a virtual host that supports correlating network level and application level traffic in accordance with aspects of the present disclosure.

FIG. 4 illustrates an example of a virtual host 400 that supports data traffic analysis in accordance with aspects of the present disclosure. The virtual host 400 includes a number of containers 405, a virtual ethernet interface 410, a docker interface 415, and an ethernet interface 420, which may be examples or components of one or more servers and/or hosts as described with reference to FIGS. 1 through 3. Host 425 may run a kernel library or module (e.g., libeBPFflow). In some examples, a packet capturing system (e.g., Moloch capture) may run as container 405-*a*. In some examples, a queue (e.g., logstash) may run as container 405-*b*.

The docker interface 415 may start, restart, pause, create, or terminate a container 405. For example, docker interface 415 may pause container 405-*c* in response to a user input, a schedule, a cron job, etc. Ethernet interface 420 may transmit data from docker interface 415, and ethernet interface 420 may transmit data to docker interface 415. In some examples, docker interface 415 may be able example of a TAP. Additionally or alternatively, a TAP (e.g., a virtual tap) may exist between docker interface 415 and ethernet interface 420. In some examples, docker interface 415 may be an example of a NAT. Additionally or alternatively, a NAT may exist between docker interface 415 and ethernet interface 420. In some cases, a TAP may support data packet monitoring.

Figure 5:
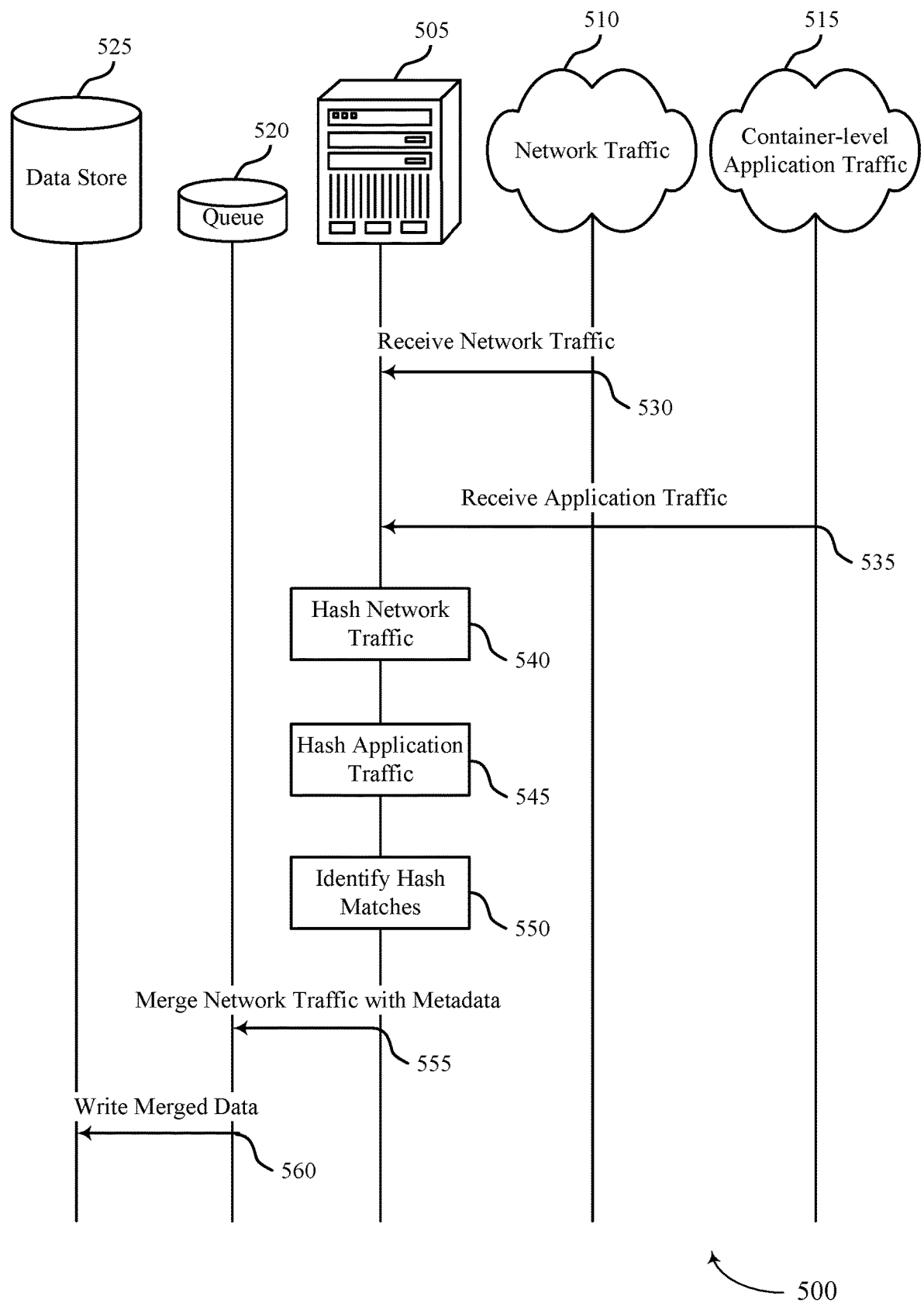
FIG. 5 illustrates an example of a process flow that supports correlating network level and application level traffic in accordance with aspects of the present disclosure.

FIG. 5 illustrates an example of a process flow 500 that supports data traffic analysis in accordance with aspects of the present disclosure. The process flow 500 includes a traffic analyzer 505, network traffic 510, container-level application traffic 515, queue 520, and data store 525. These may be examples of the corresponding devices described with reference to FIGS. 1 through 4. The traffic analyzer 505 may perform data traffic analysis. The traffic analyzer 505 may correlate network traffic 510 with container-level application traffic 515. Additionally or alternatively, the traffic analyzer 505 may correlate network traffic 510 with application connectivity information and/or application metadata. In some cases, the application connectivity information and/or application metadata may be included in container-level application traffic 515. Alternative examples of the following may be implemented, where some steps are performed in a different other than described or are not performed at all. In some cases, steps may include additional features not mentioned below, or further steps may be added.

At 530, the traffic analyzer 505 may receive network traffic. The traffic analyzer 505 may receive network traffic from a virtual TAP. In some cases, a packet capturing system (e.g., Moloch capture) may capture the network traffic. In some cases, the network traffic may contain source IP addresses, destination IP addresses, time stamp information, network protocol information, an amount of data, or any combination thereof.

At 535, the traffic analyzer 505 may receive application traffic. In some cases, the application traffic may be originating from or ending at a container. The traffic analyzer 505 may receive application traffic and/or application metadata from a kernel library or module (e.g., libeBPFflow). In some cases, a kernel library or module may transmit the application traffic and/or application metadata to traffic analyzer 505. In some cases, the application traffic may contain source IP addresses, destination IP addresses, time stamp information, network protocol information, an amount of data, or any combination thereof. In some cases, the application traffic may contain application metadata (e.g., host ID, container ID, process ID, user, binary name, etc.).

At 540, the traffic analyzer 505 may hash network traffic. The traffic analyzer 505 may hash one or more fields of the received network traffic. In some examples, the traffic analyzer 505 may hash the same fields for every received network traffic packet. In some examples, the traffic analyzer 505 may hash different fields for different received network traffic packets. In some cases, the traffic analyzer 505 may create a set of hashes for one or more received network traffic packets. In some examples, the hashes in the set of hashes may correspond to fields of a received network traffic packet.

At 545, the traffic analyzer 505 may hash application traffic. The traffic analyzer 505 may hash one or more fields of the received application traffic. In some examples, the traffic analyzer 505 may hash the same fields for every received application traffic packet. In some examples, the traffic analyzer 505 may hash different fields for different received application traffic packets. In some cases, the traffic analyzer 505 may create a set of hashes one or more received application traffic packets. In some examples, the hashes in the set of hashes may correspond to fields of a received application traffic packet. In some examples, the application metadata may be associated with application traffic. In some examples, the traffic analyzer 505 may associate an application traffic packet with application metadata.

At 550, the traffic analyzer 505 may identify one or more matching hash values. In some cases, the traffic analyzer 505 may identify one or more matching hashes based on comparing the hashes corresponding to a network traffic packet (e.g., a message) and the hashes corresponding to an application traffic packet (e.g., a message). In some examples, the traffic analyzer 505 may identify one or more matching hash values for the first set of hash values and the second set of hash values.

At 555, the traffic analyzer 505 may merge network traffic data with metadata associated with corresponding application traffic data into a queue 520. The network traffic data and application metadata may be merged based on the one or more identified hash matches. For example, if a hash corresponding to a first application packet matches a hash corresponding to a first network packet, the metadata associated with the first application packet may be merged with the first network packet. In some cases, a network packet, an application packet, application metadata, or any combination thereof, may be merged together. In some cases, the traffic analyzer 505 may merge network traffic data with metadata associated into a standard format (e.g., packet capture data format (PCAP)).

At 560, the queue 520 (e.g., logstash) may write the merged data to a data store 525 (e.g., an elastic search). In some cases, the queue 520 may write the merged data to the data store 525 in accordance with a first in, first out policy. In some cases, the queue 520 may write the merged data to the data store 525 according to a data priority, a data size, a timestamp, a source address, or a destination address of network traffic data. In some cases, the queue 520 may write the merged data to the data store 525 according to a host ID, container ID, process ID, user, or a binary name of application metadata.

Figure 6:
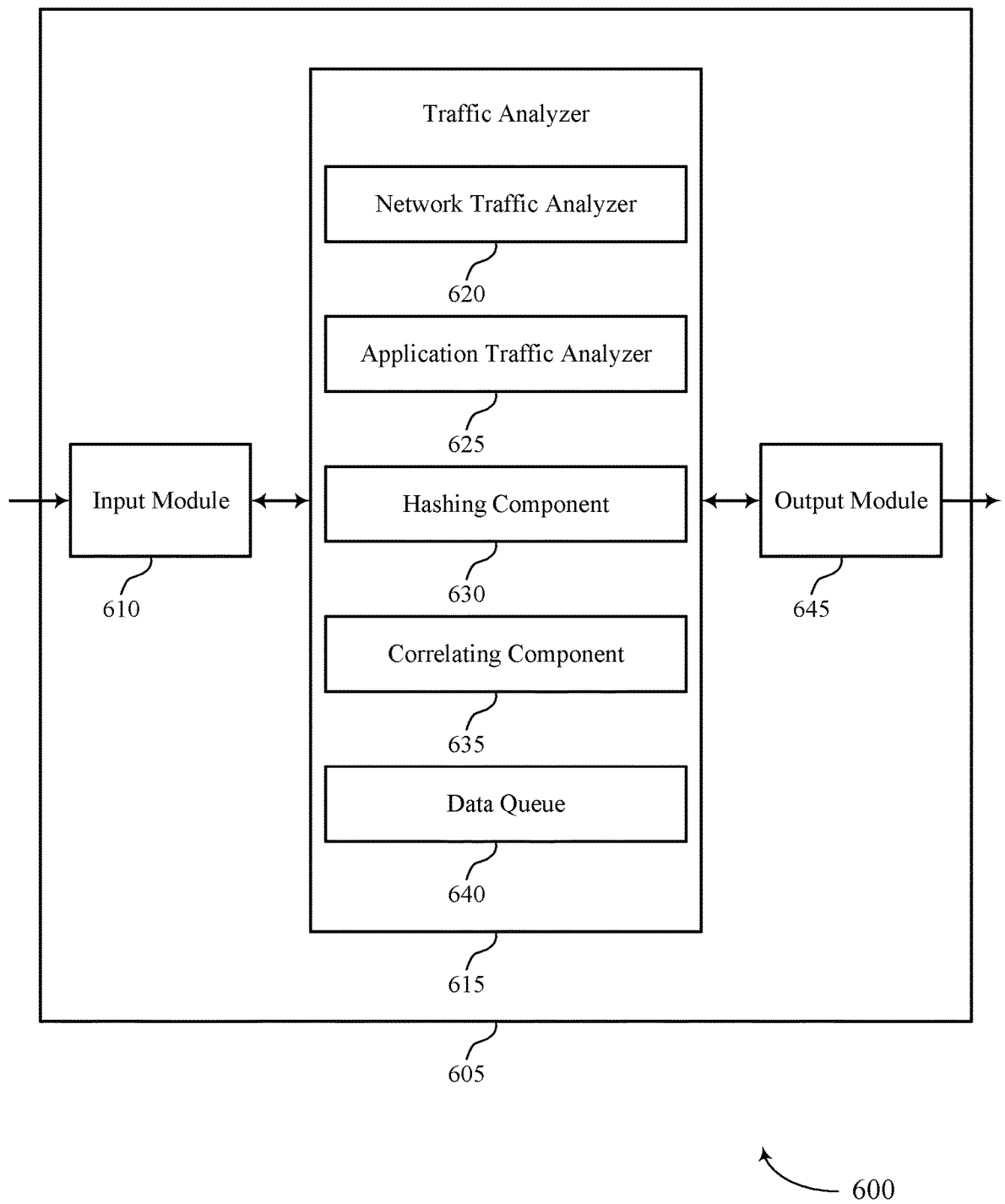
FIG. 6 shows a block diagram of an apparatus that supports correlating network level and application level traffic in accordance with aspects of the present disclosure.

FIG. 6 shows a block diagram 600 of an apparatus 605 that supports correlating network level and application level traffic in accordance with aspects of the present disclosure. The apparatus 605 may include an input module 610, a traffic analyzer 615, and an output module 645. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the data retention module 615 to support data retention handling for data object stores. In some cases, the input module 610 may be a component of an input/output (I/O) controller 815 as described with reference to FIG. 8.

The traffic analyzer 615 may include a network traffic analyzer 620, an application traffic analyzer 625, a hashing component 630, a correlating component 635, and a data queue 640. The traffic analyzer 615 may be an example of aspects of the traffic analyzer 705 or 810 described with reference to FIGS. 7 and 8.

The traffic analyzer 615 and/or at least some of its various sub-components may be implemented in hardware, software executed by a processor, firmware, or any combination thereof. If implemented in software executed by a processor, the functions of the traffic analyzer 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The traffic analyzer 615 and/or at least some of its various sub-components may be physically located at various positions, including being distributed such that portions of functions are implemented at different physical locations by one or more physical devices. In some examples, the traffic analyzer 615 and/or at least some of its various sub-components may be a separate and distinct component in accordance with various aspects of the present disclosure. In other examples, the traffic analyzer 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The network traffic analyzer 620 may receive network traffic data from a network-level data capture system, where the network traffic data includes source addresses, destination addresses, time stamp information, network protocol and data amount information.

The application traffic analyzer 625 may receive container-level application traffic data from a container-level data capture system, where the application traffic data includes source addresses, destination addresses, time stamp information, network protocol and data amount information.

The hashing component 630 may hash at least the source and destination addresses, the time stamp information, and the data amount information from the network traffic data to create a first set of hash values and hash at least the source and destination addresses, the time stamp information, and the data amount information from the application traffic data to create a second set of hash values from the container-level application traffic data.

The correlating component 635 may identify matching hash values from the first set of hash values and the second set of hash values.

The data queue 640 may merge into a queue, for each matching hash value, the corresponding network traffic data with metadata associated with the corresponding application traffic data to create a merged data set and write the merged data set from the queue to a data store.

The output module 645 may manage output signals for the apparatus 605. For example, the output module 645 may receive signals from other components of the apparatus 605, such as the data retention module 615, and may transmit these signals to other components or devices. In some specific examples, the output module 645 may transmit output signals for display in a user interface, for storage in a database or data store, for further processing at a server or server cluster, or for any other processes at any number of devices or systems. In some cases, the output module 645 may be a component of an I/O controller 815 as described with reference to FIG. 8.

Figure 7:
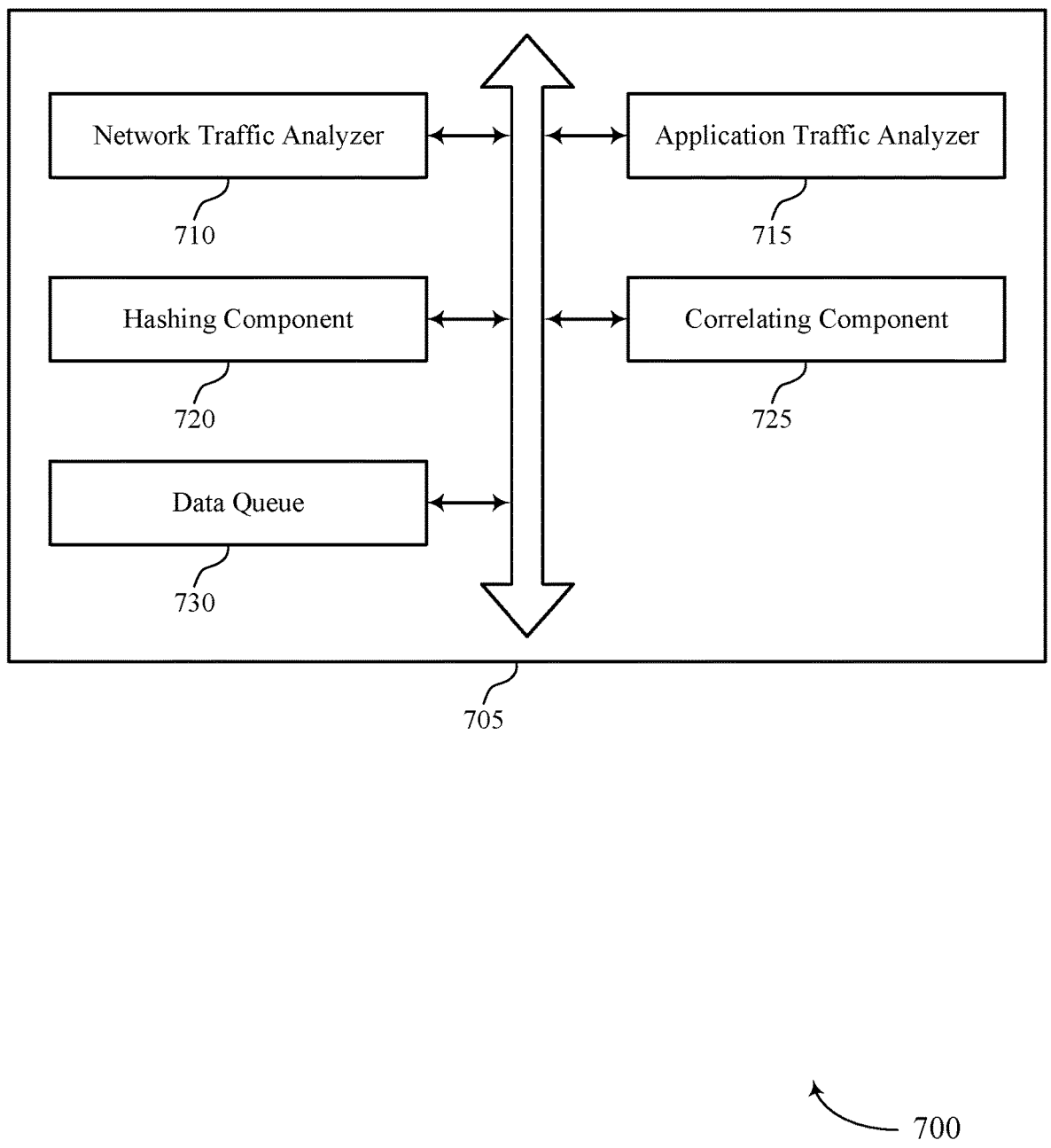
FIG. 7 shows a block diagram of a traffic analyzer that supports correlating network level and application level traffic in accordance with aspects of the present disclosure.

FIG. 7 shows a block diagram 700 of a traffic analyzer 705 that supports correlating network level and application level traffic in accordance with aspects of the present disclosure. The traffic analyzer 705 may be an example of aspects of a traffic analyzer 615 or a traffic analyzer 810 described herein. The traffic analyzer 705 may include a network traffic analyzer 710, an application traffic analyzer 715, a hashing component 720, a correlating component 725, and a data queue 730. Each of these modules may communicate, directly or indirectly, with one another (e.g., via one or more buses).

The network traffic analyzer 710 may receive network traffic data from a network-level data capture system, where the network traffic data includes source addresses, destination addresses, time stamp information, network protocol and data amount information.

In some cases, the network-level data capture system includes a tap.

In some cases, the network-level data capture system is configured to capture communications over a virtual network layer, a cloud provider network layer, or both.

The application traffic analyzer 715 may receive container-level application traffic data from a container-level data capture system, where the application traffic data includes source addresses, destination addresses, time stamp information, network protocol and data amount information.

In some examples, capturing the metadata, where the metadata includes a host identifier, a container identifier, a process identifier, a user identifier, a binary name, or a combination thereof.

In some cases, the application-level data capture system includes a traffic visibility library.

In some cases, the application-level data capture system is configured to capture communications over an overlay network layer, an integration bridge layer within a container orchestration platform, or a combination thereof.

The hashing component 720 may hash at least the source and destination addresses, the time stamp information, and the data amount information from the network traffic data to create a first set of hash values.

In some examples, the hashing component 720 may hash at least the source and destination addresses, the time stamp information, and the data amount information from the application traffic data to create a second set of hash values from the container-level application traffic data.

The correlating component 725 may identify matching hash values from the first set of hash values and the second set of hash values.

In some examples, the correlating component 725 may identify an application as an originator of a subset of the received network traffic data based on the merged data set.

In some cases, the source addresses from the network traffic data and the source addresses from the application traffic data include IP addresses, port numbers, or both.

In some cases, the destination addresses from the network traffic data and the destination addresses from the application traffic data include IP addresses, port numbers, or both.

In some cases, the container-level application traffic data and the network traffic data originates from one or more applications running within one or more containers.

In some cases, the one or more containers are running within a host in a public cloud environment.

The data queue 730 may merge into a queue, for each matching hash value, the corresponding network traffic data with metadata associated with the corresponding application traffic data to create a merged data set.

In some examples, the data queue 730 may write the merged data set from the queue to a data store.

Figure 8:
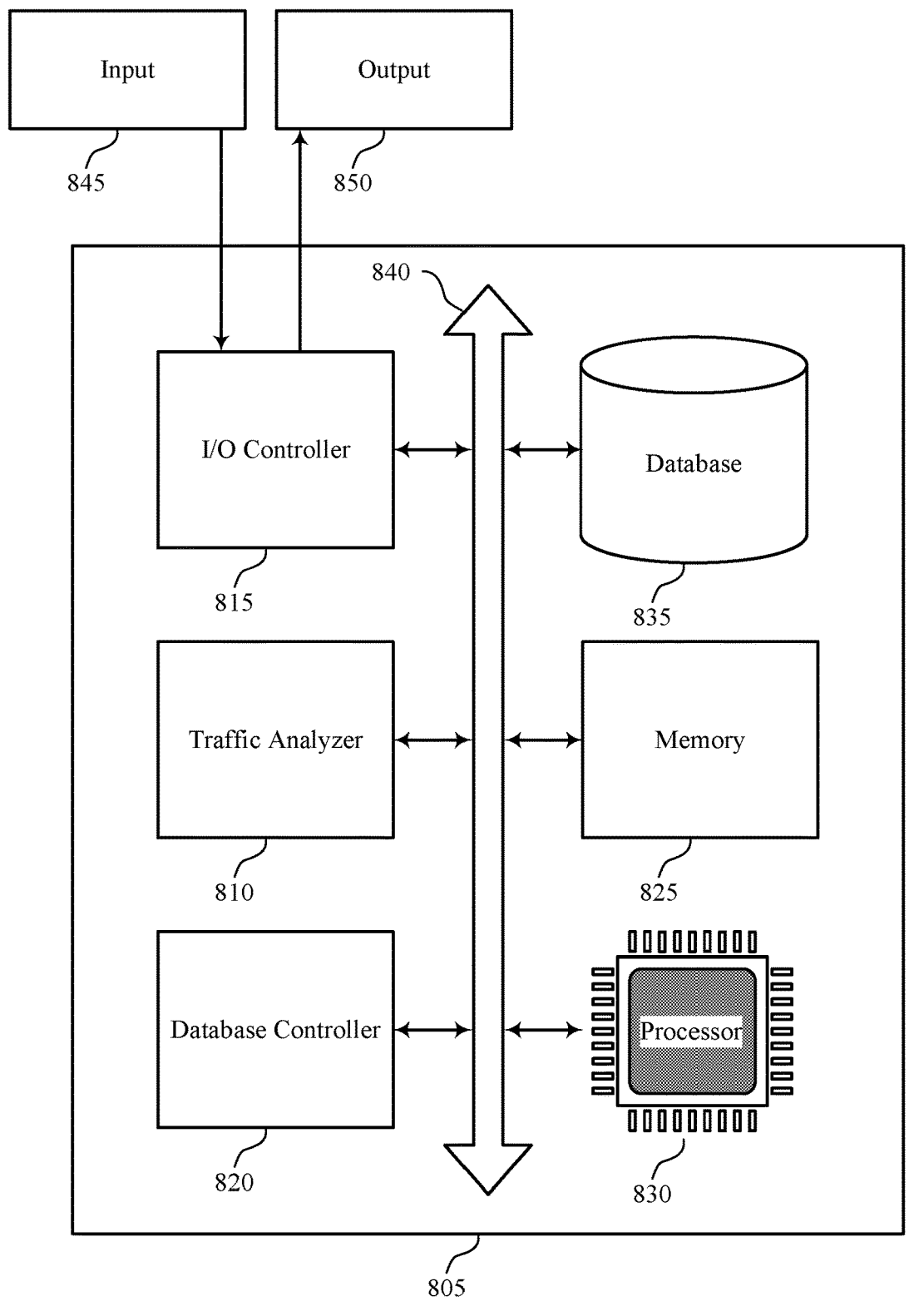
FIG. 8 shows a diagram of a system including a device that supports correlating network level and application level traffic in accordance with aspects of the present disclosure.

FIG. 8 shows a diagram of a system 800 including a device 805 that supports correlating network level and application level traffic in accordance with aspects of the present disclosure. The device 805 may be an example of or include the components of a application server or an apparatus 605 as described herein. The device 805 may include components for bi-directional data communications including components for transmitting and receiving communications, including a traffic analyzer 810, an I/O controller 815, a database controller 820, memory 825, a processor 830, and a database 835. These components may be in electronic communication via one or more buses (e.g., bus 840).

The traffic analyzer 810 may be an example of a traffic analyzer 615 or 705 as described herein. For example, the traffic analyzer 810 may perform any of the methods or processes described above with reference to FIGS. 6 and 7. In some cases, the traffic analyzer 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting correlating network level and application level traffic).

Figure 9:
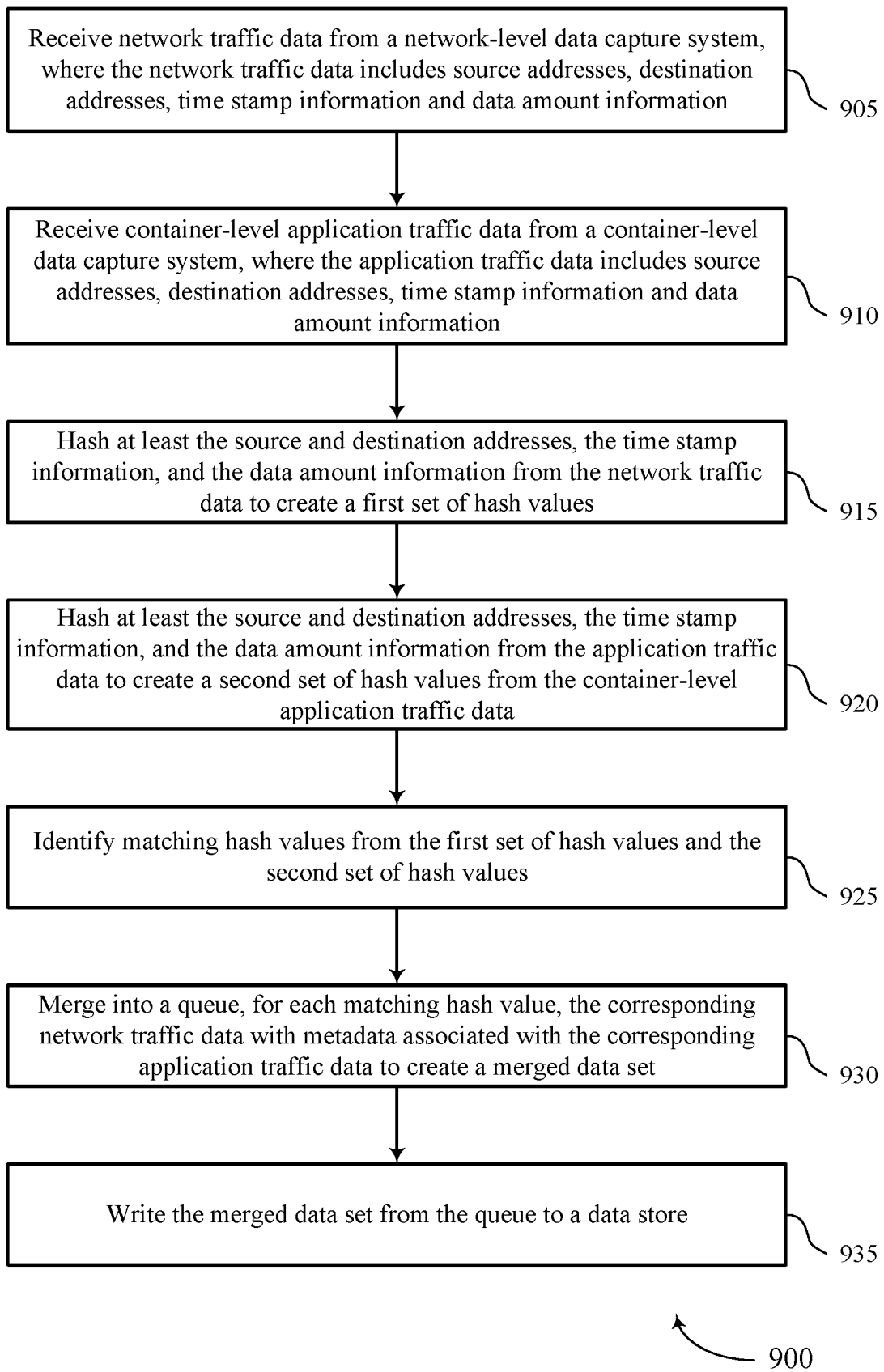
FIGS. 9 through 11 show flowcharts illustrating methods that support correlating network level and application level traffic in accordance with aspects of the present disclosure.

FIG. 9 shows a flowchart illustrating a method 900 that supports correlating network level and application level traffic in accordance with aspects of the present disclosure. The operations of method 900 may be implemented by a application server or its components as described herein. For example, the operations of method 900 may be performed by a traffic analyzer as described with reference to FIGS. 6 through 8. In some examples, a application server may execute a set of instructions to control the functional elements of the application server to perform the functions described below. Additionally or alternatively, a application server may perform aspects of the functions described below using special-purpose hardware.

At 905, the application server may receive network traffic data from a network-level data capture system, where the network traffic data includes source addresses, destination addresses, time stamp information, network protocol and data amount information. The operations of 905 may be performed according to the methods described herein. In some examples, aspects of the operations of 905 may be performed by a network traffic analyzer as described with reference to FIGS. 6 through 8.

At 910, the application server may receive container-level application traffic data from a container-level data capture system, where the application traffic data includes source addresses, destination addresses, time stamp information, network protocol and data amount information. The operations of 910 may be performed according to the methods described herein. In some examples, aspects of the operations of 910 may be performed by an application traffic analyzer as described with reference to FIGS. 6 through 8.

At 915, the application server may hash at least the source and destination addresses, the time stamp information, and the data amount information from the network traffic data to create a first set of hash values. The operations of 915 may be performed according to the methods described herein. In some examples, aspects of the operations of 915 may be performed by a hashing component as described with reference to FIGS. 6 through 8.

At 920, the application server may hash at least the source and destination addresses, the time stamp information, and the data amount information from the application traffic data to create a second set of hash values from the container-level application traffic data. The operations of 920 may be performed according to the methods described herein. In some examples, aspects of the operations of 920 may be performed by a hashing component as described with reference to FIGS. 6 through 8.

At 925, the application server may identify matching hash values from the first set of hash values and the second set of hash values. The operations of 925 may be performed according to the methods described herein. In some examples, aspects of the operations of 925 may be performed by a correlating component as described with reference to FIGS. 6 through 8.

At 930, the application server may merge into a queue, for each matching hash value, the corresponding network traffic data with metadata associated with the corresponding application traffic data to create a merged data set. The operations of 930 may be performed according to the methods described herein. In some examples, aspects of the operations of 930 may be performed by a data queue as described with reference to FIGS. 6 through 8.

At 935, the application server may write the merged data set from the queue to a data store. The operations of 935 may be performed according to the methods described herein. In some examples, aspects of the operations of 935 may be performed by a data queue as described with reference to FIGS. 6 through 8.

Figure 10:
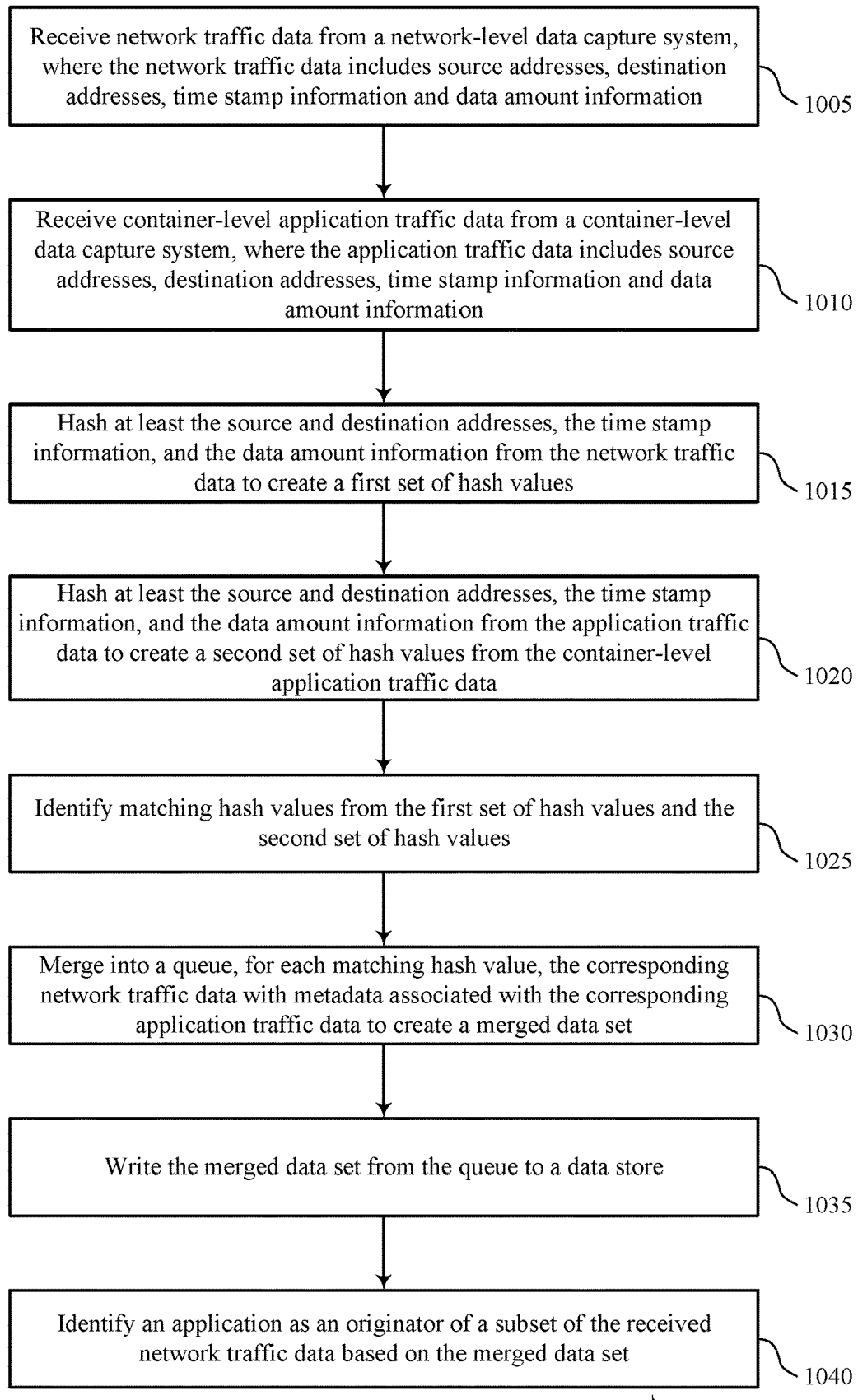

FIG. 10 shows a flowchart illustrating a method 1000 that supports correlating network level and application level traffic in accordance with aspects of the present disclosure. The operations of method 1000 may be implemented by a application server or its components as described herein. For example, the operations of method 1000 may be performed by a traffic analyzer as described with reference to FIGS. 6 through 8. In some examples, a application server may execute a set of instructions to control the functional elements of the application server to perform the functions described below. Additionally or alternatively, a application server may perform aspects of the functions described below using special-purpose hardware.

At 1005, the application server may receive network traffic data from a network-level data capture system, where the network traffic data includes source addresses, destination addresses, time stamp information, network protocol and data amount information. The operations of 1005 may be performed according to the methods described herein. In some examples, aspects of the operations of 1005 may be performed by a network traffic analyzer as described with reference to FIGS. 6 through 8.

At 1010, the application server may receive container-level application traffic data from a container-level data capture system, where the application traffic data includes source addresses, destination addresses, time stamp information, network protocol and data amount information. The operations of 1010 may be performed according to the methods described herein. In some examples, aspects of the operations of 1010 may be performed by an application traffic analyzer as described with reference to FIGS. 6 through 8.

At 1015, the application server may hash at least the source and destination addresses, the time stamp information, and the data amount information from the network traffic data to create a first set of hash values. The operations of 1015 may be performed according to the methods described herein. In some examples, aspects of the operations of 1015 may be performed by a hashing component as described with reference to FIGS. 6 through 8.

At 1020, the application server may hash at least the source and destination addresses, the time stamp information, and the data amount information from the application traffic data to create a second set of hash values from the container-level application traffic data. The operations of 1020 may be performed according to the methods described herein. In some examples, aspects of the operations of 1020 may be performed by a hashing component as described with reference to FIGS. 6 through 8.

At 1025, the application server may identify matching hash values from the first set of hash values and the second set of hash values. The operations of 1025 may be performed according to the methods described herein. In some examples, aspects of the operations of 1025 may be performed by a correlating component as described with reference to FIGS. 6 through 8.

At 1030, the application server may merge into a queue, for each matching hash value, the corresponding network traffic data with metadata associated with the corresponding application traffic data to create a merged data set. The operations of 1030 may be performed according to the methods described herein. In some examples, aspects of the operations of 1030 may be performed by a data queue as described with reference to FIGS. 6 through 8.

At 1035, the application server may write the merged data set from the queue to a data store. The operations of 1035 may be performed according to the methods described herein. In some examples, aspects of the operations of 1035 may be performed by a data queue as described with reference to FIGS. 6 through 8.

At 1040, the application server may identify an application as an originator of a subset of the received network traffic data based on the merged data set. The operations of 1040 may be performed according to the methods described herein. In some examples, aspects of the operations of 1040 may be performed by a correlating component as described with reference to FIGS. 6 through 8.

Figure 11:
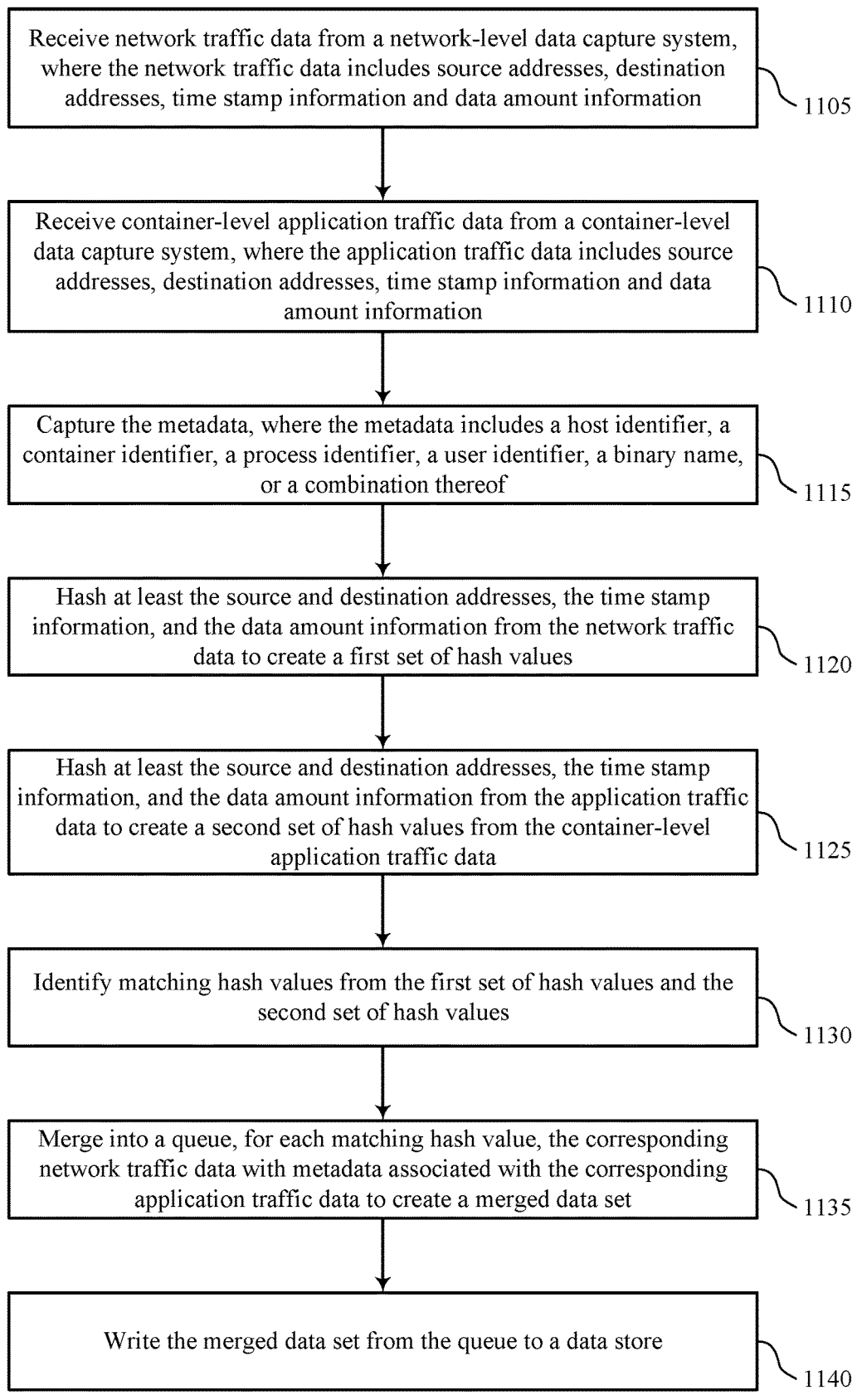

FIG. 11 shows a flowchart illustrating a method 1100 that supports correlating network level and application level traffic in accordance with aspects of the present disclosure. The operations of method 1100 may be implemented by a application server or its components as described herein. For example, the operations of method 1100 may be performed by a traffic analyzer as described with reference to FIGS. 6 through 8. In some examples, a application server may execute a set of instructions to control the functional elements of the application server to perform the functions described below. Additionally or alternatively, a application server may perform aspects of the functions described below using special-purpose hardware.

At 1105, the application server may receive network traffic data from a network-level data capture system, where the network traffic data includes source addresses, destination addresses, time stamp information, network protocol and data amount information. The operations of 1105 may be performed according to the methods described herein. In some examples, aspects of the operations of 1105 may be performed by a network traffic analyzer as described with reference to FIGS. 6 through 8.

At 1110, the application server may receive container-level application traffic data from a container-level data capture system, where the application traffic data includes source addresses, destination addresses, time stamp information, network protocol and data amount information. The operations of 1110 may be performed according to the methods described herein. In some examples, aspects of the operations of 1110 may be performed by an application traffic analyzer as described with reference to FIGS. 6 through 8.

At 1115, the application server may capture the metadata, where the metadata includes a host identifier, a container identifier, a process identifier, a user identifier, a binary name, or a combination thereof. The operations of 1115 may be performed according to the methods described herein. In some examples, aspects of the operations of 1115 may be performed by an application traffic analyzer as described with reference to FIGS. 6 through 8.

At 1120, the application server may hash at least the source and destination addresses, the time stamp information, and the data amount information from the network traffic data to create a first set of hash values. The operations of 1120 may be performed according to the methods described herein. In some examples, aspects of the operations of 1120 may be performed by a hashing component as described with reference to FIGS. 6 through 8.

At 1125, the application server may hash at least the source and destination addresses, the time stamp information, and the data amount information from the application traffic data to create a second set of hash values from the container-level application traffic data. The operations of 1125 may be performed according to the methods described herein. In some examples, aspects of the operations of 1125 may be performed by a hashing component as described with reference to FIGS. 6 through 8.

At 1130, the application server may identify matching hash values from the first set of hash values and the second set of hash values. The operations of 1130 may be performed according to the methods described herein. In some examples, aspects of the operations of 1130 may be performed by a correlating component as described with reference to FIGS. 6 through 8.

At 1135, the application server may merge into a queue, for each matching hash value, the corresponding network traffic data with metadata associated with the corresponding application traffic data to create a merged data set. The operations of 1135 may be performed according to the methods described herein. In some examples, aspects of the operations of 1135 may be performed by a data queue as described with reference to FIGS. 6 through 8.

At 1140, the application server may write the merged data set from the queue to a data store. The operations of 1140 may be performed according to the methods described herein. In some examples, aspects of the operations of 1140 may be performed by a data queue as described with reference to FIGS. 6 through 8.

A method of data processing is described. The method may include receiving network traffic data from a network-level data capture system, where the network traffic data includes source addresses, destination addresses, time stamp information, network protocol and data amount information, receiving container-level application traffic data from a container-level data capture system, where the application traffic data includes source addresses, destination addresses, time stamp information, network protocol and data amount information, hashing at least the source and destination addresses, the time stamp information, and the data amount information from the network traffic data to create a first set of hash values, hashing at least the source and destination addresses, the time stamp information, and the data amount information from the application traffic data to create a second set of hash values from the container-level application traffic data, identifying matching hash values from the first set of hash values and the second set of hash values, merging into a queue, for each matching hash value, the corresponding network traffic data with metadata associated with the corresponding application traffic data to create a merged data set, and writing the merged data set from the queue to a data store.

An apparatus for data processing is described. The apparatus may include a processor, memory coupled with the processor, and instructions stored in the memory. The instructions may be executable by the processor to cause the apparatus to receive network traffic data from a network-level data capture system, where the network traffic data includes source addresses, destination addresses, time stamp information, network protocol and data amount information, receive container-level application traffic data from a container-level data capture system, where the application traffic data includes source addresses, destination addresses, time stamp information, network protocol and data amount information, hash at least the source and destination addresses, the time stamp information, and the data amount information from the network traffic data to create a first set of hash values, hash at least the source and destination addresses, the time stamp information, and the data amount information from the application traffic data to create a second set of hash values from the container-level application traffic data, identify matching hash values from the first set of hash values and the second set of hash values, merge into a queue, for each matching hash value, the corresponding network traffic data with metadata associated with the corresponding application traffic data to create a merged data set, and write the merged data set from the queue to a data store.

Another apparatus for data processing is described. The apparatus may include means for receiving network traffic data from a network-level data capture system, where the network traffic data includes source addresses, destination addresses, time stamp information, network protocol and data amount information, receiving container-level application traffic data from a container-level data capture system, where the application traffic data includes source addresses, destination addresses, time stamp information, network protocol and data amount information, hashing at least the source and destination addresses, the time stamp information, and the data amount information from the network traffic data to create a first set of hash values, hashing at least the source and destination addresses, the time stamp information, and the data amount information from the application traffic data to create a second set of hash values from the container-level application traffic data, identifying matching hash values from the first set of hash values and the second set of hash values, merging into a queue, for each matching hash value, the corresponding network traffic data with metadata associated with the corresponding application traffic data to create a merged data set, and writing the merged data set from the queue to a data store.

A non-transitory computer-readable medium storing code for data processing is described. The code may include instructions executable by a processor to receive network traffic data from a network-level data capture system, where the network traffic data includes source addresses, destination addresses, time stamp information, network protocol and data amount information, receive container-level application traffic data from a container-level data capture system, where the application traffic data includes source addresses, destination addresses, time stamp information, network protocol and data amount information, hash at least the source and destination addresses, the time stamp information, and the data amount information from the network traffic data to create a first set of hash values, hash at least the source and destination addresses, the time stamp information, and the data amount information from the application traffic data to create a second set of hash values from the container-level application traffic data, identify matching hash values from the first set of hash values and the second set of hash values, merge into a queue, for each matching hash value, the corresponding network traffic data with metadata associated with the corresponding application traffic data to create a merged data set, and write the merged data set from the queue to a data store.

Some examples of the method, apparatuses, and non-transitory computer-readable medium described herein may further include operations, features, means, or instructions for identifying an application as an originator of a subset of the received network traffic data based on the merged data set.

Some examples of the method, apparatuses, and non-transitory computer-readable medium described herein may further include operations, features, means, or instructions for capturing the metadata, where the metadata includes a host identifier, a container identifier, a process identifier, a user identifier, a binary name, or a combination thereof.

In some examples of the method, apparatuses, and non-transitory computer-readable medium described herein, the source addresses from the network traffic data and the source addresses from the application traffic data include IP addresses, port numbers, or both.

In some examples of the method, apparatuses, and non-transitory computer-readable medium described herein, the destination addresses from the network traffic data and the destination addresses from the application traffic data include IP addresses, port numbers, or both.

In some examples of the method, apparatuses, and non-transitory computer-readable medium described herein, the network-level data capture system includes a tap.

In some examples of the method, apparatuses, and non-transitory computer-readable medium described herein, the application-level data capture system includes a traffic visibility library.

In some examples of the method, apparatuses, and non-transitory computer-readable medium described herein, the network-level data capture system may be configured to capture communications over a virtual network layer, a cloud provider network layer, or both.

In some examples of the method, apparatuses, and non-transitory computer-readable medium described herein, the application-level data capture system may be configured to capture communications over an overlay network layer, an integration bridge layer within a container orchestration platform, or a combination thereof In some examples of the method, apparatuses, and non-transitory computer-readable medium described herein, the container-level application traffic data and the network traffic data originates from one or more applications running within one or more containers.

In some examples of the method, apparatuses, and non-transitory computer-readable medium described herein, the one or more containers may be running within a host in a public cloud environment.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method of data processing, comprising:
   receiving network traffic data from a network-level data capture system, wherein the network traffic data comprises source addresses, destination addresses, time stamp information, and data amount information;
   receiving container-level application traffic data from a container-level data capture system, wherein the application traffic data comprises source addresses, destination addresses, time stamp information, and data amount information;
   hashing at least the source and destination addresses, the time stamp information, and the data amount information from the network traffic data to create a first set of hash values;
   hashing at least the source and destination addresses, the time stamp information, and the data amount information from the application traffic data to create a second set of hash values from the container-level application traffic data;
   identifying matching hash values from the first set of hash values and the second set of hash values;
   merging into a queue, for each matching hash value, the corresponding network traffic data with metadata associated with the corresponding application traffic data to create a merged data set; and
   writing the merged data set from the queue to a data store.

2. The method of claim 1, further comprising:
   identifying an application as an originator of a subset of the received network traffic data based at least in part on the merged data set.

3. The method of claim 1, further comprising:
   capturing the metadata, wherein the metadata comprises a host identifier, a container identifier, a process identifier, a user identifier, a binary name, or a combination thereof.

4. The method of claim 1, wherein the source addresses from the network traffic data and the source addresses from the application traffic data comprise IP addresses, port numbers, or both.

5. The method of claim 1, wherein the destination addresses from the network traffic data and the destination addresses from the application traffic data comprise IP addresses, port numbers, or both.

6. The method of claim 1, wherein the network-level data capture system comprises a tap.

7. The method of claim 1, wherein the application-level data capture system comprises a traffic visibility library.

8. The method of claim 1, wherein the network-level data capture system is configured to capture communications over a virtual network layer, a cloud provider network layer, or both.

9. The method of claim 1, wherein the application-level data capture system is configured to capture communications over an overlay network layer, an integration bridge layer within a container orchestration platform, or a combination thereof.

10. The method of claim 1, wherein the container-level application traffic data and the network traffic data originates from one or more applications running within one or more containers.

11. The method of claim 10, wherein the one or more containers are running within a host in a public cloud environment.

12. An apparatus for data processing, comprising:
a processor,
memory coupled with the processor; and
instructions stored in the memory and executable by the processor to cause the apparatus to:
receive network traffic data from a network-level data capture system, wherein the network traffic data comprises source addresses, destination addresses, time stamp information, and data amount information;
receive container-level application traffic data from a container-level data capture system, wherein the application traffic data comprises source addresses, destination addresses, time stamp information, and data amount information;
hash at least the source and destination addresses, the time stamp information, and the data amount information from the network traffic data to create a first set of hash values;
hash at least the source and destination addresses, the time stamp information, and the data amount information from the application traffic data to create a second set of hash values from the container-level application traffic data;
identify matching hash values from the first set of hash values and the second set of hash values;
merge into a queue, for each matching hash value, the corresponding network traffic data with metadata associated with the corresponding application traffic data to create a merged data set; and
write the merged data set from the queue to a data store.

13. The apparatus of claim 12, wherein the instructions are further executable by the processor to cause the apparatus to:
identify an application as an originator of a subset of the received network traffic data based at least in part on the merged data set.

14. The apparatus of claim 12, wherein the instructions are further executable by the processor to cause the apparatus to:
capture the metadata, wherein the metadata comprises a host identifier, a container identifier, a process identifier, a user identifier, a binary name, or a combination thereof.

15. The apparatus of claim 12, wherein the source addresses from the network traffic data and the source addresses from the application traffic data comprise IP addresses, port numbers, or both.

16. The apparatus of claim 12, wherein the destination addresses from the network traffic data and the destination addresses from the application traffic data comprise IP addresses, port numbers, or both.

17. The apparatus of claim 12, wherein the network-level data capture system comprises a tap.

18. The apparatus of claim 12, wherein the application-level data capture system comprises a traffic visibility library.

19. The apparatus of claim 12, wherein the application-level data capture system is configured to capture communications over an overlay network layer, an integration bridge layer within a container orchestration platform, or a combination thereof.

20. A non-transitory computer-readable medium storing code for data processing, the code comprising instructions executable by a processor to:
receive network traffic data from a network-level data capture system, wherein the network traffic data comprises source addresses, destination addresses, time stamp information, and data amount information;
receive container-level application traffic data from a container-level data capture system, wherein the application traffic data comprises source addresses, destination addresses, time stamp information, and data amount information;
hash at least the source and destination addresses, the time stamp information, and the data amount information from the network traffic data to create a first set of hash values;
hash at least the source and destination addresses, the time stamp information, and the data amount information from the application traffic data to create a second set of hash values from the container-level application traffic data;
identify matching hash values from the first set of hash values and the second set of hash values;
merge into a queue, for each matching hash value, the corresponding network traffic data with metadata associated with the corresponding application traffic data to create a merged data set; and
write the merged data set from the queue to a data store.

* * * * *